(No Model.) 2 Sheets—Sheet 1.

R. I. HAMPTON.
PIPE COUPLING FOR STEAM HEATING OR OTHER PIPES.

No. 455,202. Patented June 30, 1891.

Witnesses.
Robert Burtt.
Geo. W. Rea.

Inventor.
Robert I. Hampton.
By James L. Norris.
Atty.

(No Model.) 2 Sheets—Sheet 2.
R. I. HAMPTON.
PIPE COUPLING FOR STEAM HEATING OR OTHER PIPES.
No. 455,202. Patented June 30, 1891.
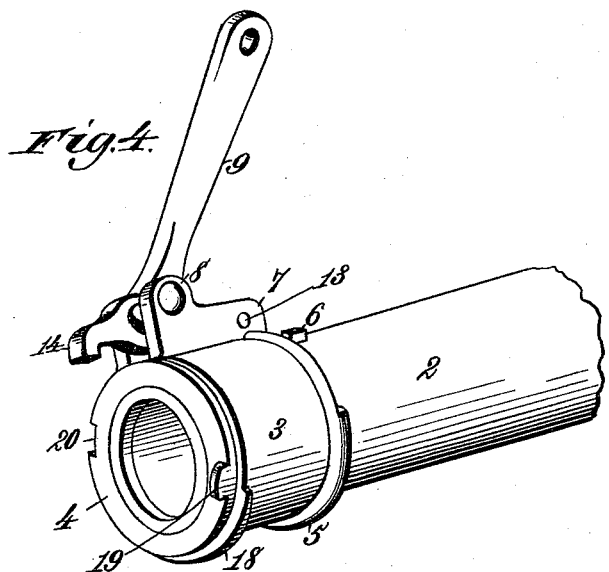
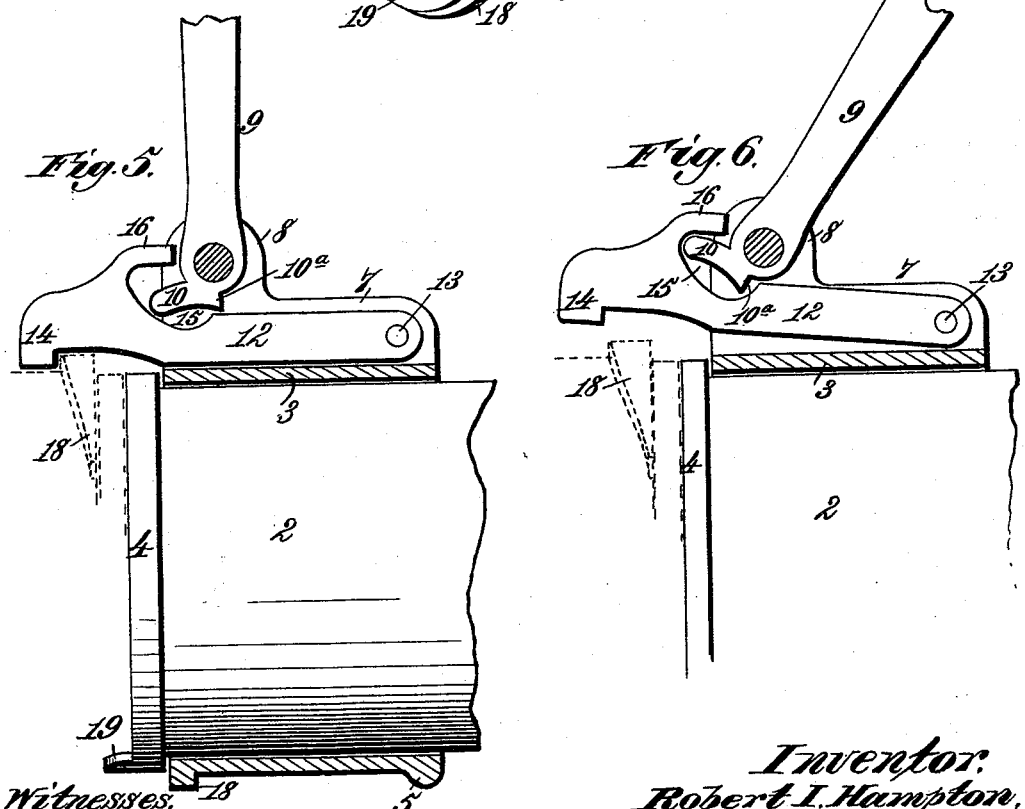

UNITED STATES PATENT OFFICE.

ROBERT I. HAMPTON, OF ATHENS, GEORGIA.

PIPE-COUPLING FOR STEAM-HEATING OR OTHER PIPES.

SPECIFICATION forming part of Letters Patent No. 455,202, dated June 30, 1891.

Application filed April 11, 1891. Serial No. 388,479. (No model.)

*To all whom it may concern:*

Be it known that I, ROBERT I. HAMPTON, a citizen of the United States, residing at Athens, in the county of Clarke and State of Georgia, have invented new and useful Improvements in Pipe-Couplings for Steam-Heating and other Pipes, of which the following is a specification.

My invention relates to pipe-couplings of the type employed in connecting the ends of the train-pipes conveying steam or other heating medium to the radiators of railway-cars.

It is the purpose of my invention to provide a pipe-coupling of this character in which the construction and arrangement of the parts shall be of the most simple kind, said parts being so organized that the train-pipes shall be automatically uncoupled by the separation of the cars produced either by the breaking of the train while under way or other accident or by drawing the cars apart for any purpose.

It is my further purpose to provide a coupling of the type specified in which the meeting ends of the train-pipes may be automatically drawn together and locked by bringing the cars into position for coupling, and in which when once coupled the jar and vibration of the travel will tend to draw the ends of the train-pipes more closely together and produce a more perfect joint.

The invention consists to these ends in the several novel features of construction and new combinations of parts hereinafter more particularly described, and then pointed out and defined in the claims which conclude this specification.

To enable others skilled in the art to make, construct, and use my said invention, I will proceed to describe the same in detail, reference being made to the accompanying drawings, in which—

Figure 1:
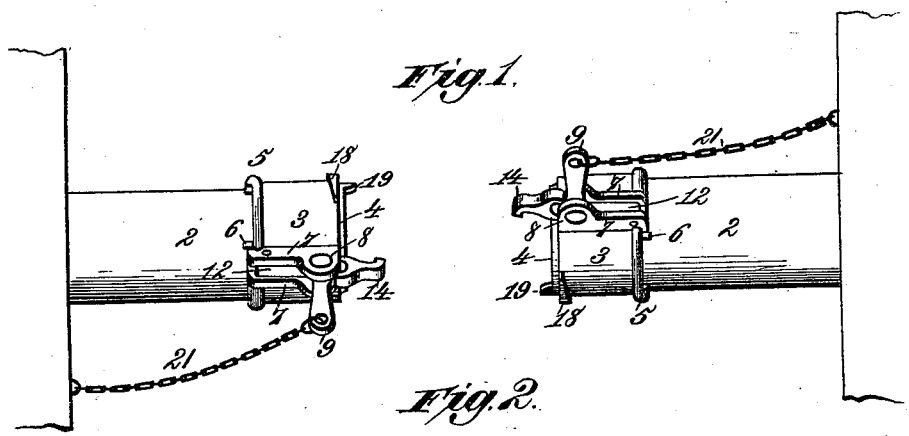
Figure 2:
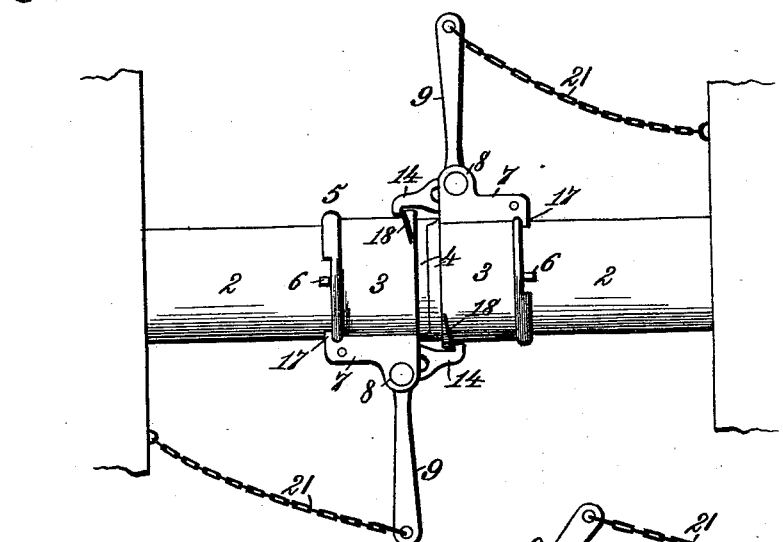
Figure 3:
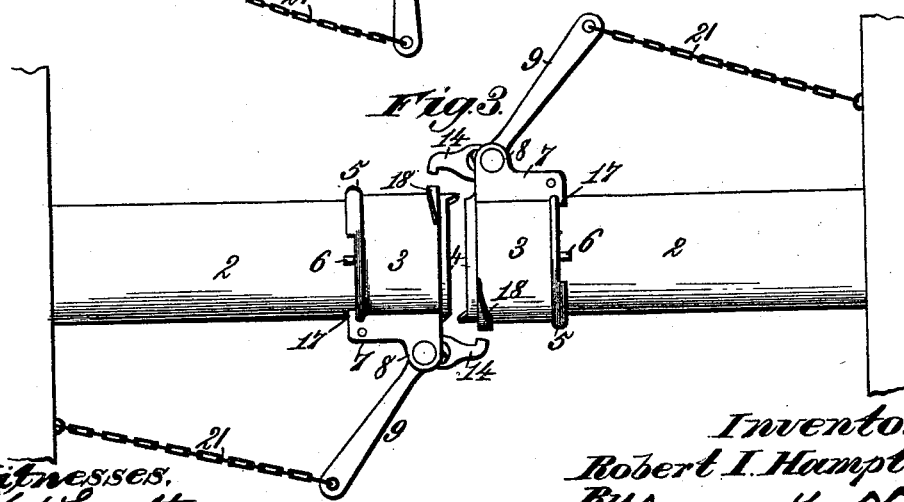

Figure 1 is a plan view showing a fractional part of the two car-platforms and the ends of the train-pipes, or of the coupling-sections of said pipes, provided with my invention, the parts being shown in a position ready for coupling. Fig. 2 is a similar view showing the parts coupled in the manner contemplated by my invention. Fig. 3 is a plan view of the same parts, showing the automatic action of the coupling devices, whereby the ends of the pipes are automatically released as the cars are separated. Fig. 4 is a perspective view of one of the coupling sections or ends of the train-pipe, showing my invention. Fig. 5 is a plan view of the pipe shown in Fig. 4, the coupling devices being shown in section. Fig. 6 is a similar view showing, in connection with Fig. 5, the position and action of the lift when the parts are coupled and when they are uncoupled.

In the said drawings, the reference-numeral 1 indicates the platform of a railway-car of any known pattern, its interior being heated by steam or other suitable medium circulating to and from the radiators through train-pipes upon the cars, the ends of said pipes being coupled together to form continuous passages for the flow and return of the heating medium. In carrying my invention into practice I prefer to group these two passages within a single conveyer or train-pipe of suitable diameter, the ends thereof being provided with telescoping or longitudinally-movable sections 2, connected to the train-pipe proper by a ball-and-socket joint, or by a flexible joint, or other means adapted to permit the lateral and vertical swaying of the extremities—as, for example, the construction shown in the Letters Patent granted me the 5th day of November, 1889, No. 414,640, though I may substitute therefor any other suitable means. In view of the fact, also, that the interior of the coupling portions or sections of the pipe may have a great variety of construction as regards the passages for the heating medium, including one, two, or more passages and any preferred arrangement thereof, and in view of the further fact that the features last named above form no part of my present invention I have entirely omitted all illustration of either.

Upon the end of each coupling section or extremity 2 of the train-pipe I mount a sleeve 3, preferably formed of cast-iron or malleable iron when the coupling end or section is large, though other metal may be used upon pipes of smaller diameter. The sleeve 3 is so arranged as to rotate upon the end of the coupling portion of the pipe, and it is confined in its rotating movement by a circumferential collar or flange 4, surrounding the mouth of the pipe or coupling section and turned outward, so as to project beyond the exterior surface of the pipe or section 2. Upon the rear edge of the sleeve is usually formed a circumferential rib 5, which is partially cut away through a space equal, or nearly so, to an arc of ninety degrees. In the open space so formed lies a strong pin or lug 6, projecting from the exterior surface of the pipe. This pin or lug is set closely to the edge of the collar or rib 5 to prevent longitudinal play or displacement, while it permits free rotary movement of the sleeve. The said pins or lugs are usually located on the top of the pipe or pipe-section 2 in a central vertical plane, as shown in Figs. 1, 2, and 3. Upon each sleeve 3 are formed or mounted parallel brackets 7, arranged longitudinally and extending from edge to edge of the sleeve. Upon their forward ends these brackets are provided with extensions 8, between which is pivoted or fulcrumed a lift composed of a lever 9 of the first order, having a cam-point 10, which projects in front of the fulcrum at a considerable angle with the lever 9. Directly beneath this cam-point lies a latch 12, one end extending to the rear extremities of the brackets 7, between which it is pivoted by a pin 13, while the forward end projects from beneath the cam-point 10 and beyond the open end of the pipe or pipe-section, a strong hook or jaw 14 being formed thereon in such manner that when said latch rests upon the sleeve 3 the square end of the hook will rest upon or lie in close proximity to the surface of the similar sleeve upon the other pipe-section, as shown in Figs. 2 and 5. The cam-point 10 of the lift lies in a recess 15 in the back of the latch 12, said recess being partly inclosed by a finger 16, which is curved upward and rearward and overhanging the cam-point 10, its end lying close to a rounded or convex edge upon the lever 9.

The brackets 7 are so arranged that one thereof lies in or nearly in the same longitudinal line with one of the shoulders 17, which terminate the space or race within which the pin or lug 6 is arranged. At a point opposite or nearly opposite the other shoulder 17 lies the narrow or diminished extremity of a cam-rib 18, formed upon the forward edge of the sleeve 3, the outer face of said rib being preferably coincident with the edge of the sleeve bearing upon the collar 4. The inner or rearward face of said rib diverges from the outer face at a small angle, having about the pitch of a screw-thread. The increasing or wedge-shaped cam rib or flange is continued until its thicker extremity passes somewhat by a longitudinal line drawn upon the surface of the sleeve at a point ninety degrees of arc distant from the pin or lug 6 upon the same sleeve.

Upon the end of each pipe or coupling section 2 is formed a lug 19, its outer face flush with the exterior surface of the collar 3 and its opposite edges converging somewhat, so that the lug tapers slightly from its end or point to its base. Diametrically opposite this lug is formed a seat or recess 20, formed in the outer edge of the collar 3, and of such size and configuration as to receive and fit snugly upon a lug 19 upon the other pipe-section, corresponding in form and size to that already described.

The lugs 19 and seats 20 guide the abutting ends of the pipe-sections together to a correct relative position.

I may use any suitable form of packing-ring in the open end of each pipe-section.

The coupling is effected by placing both levers at right angles with the axis of the pipe and bringing the ends of the pipes together in such manner that the jaw of each coupling will project over the opposite pipe at or near the narrow extremity of the cam-flange. A rotary movement of each pipe or pipe-section then locks the parts, the jaws sliding upon the inclined faces of the cam-flanges and drawing the ends of the pipe-sections together with great force, their action in this respect closely resembling that of nuts turning upon screw-threads.

The parts described upon one of the pipe-sections being duplicated upon the other, a description of one is sufficient for both. Each of the levers 9 is provided at its end with means for attachment of a chain or its equivalent 21, the other end thereof being attached to the platform 1, the length of the chain being such that when the pipe-sections 2 are drawn out as far as they will go the chains will become taut before this limit of movement is reached. By this means the levers are operated, the cam-points 10 are thrown against the fingers 16 of the latches, and the latter are thereby drawn off the cam-ribs 18, as seen in Fig. 3, releasing the coupling-sections 2 automatically.

While the pipe-sections may be coupled automatically, as well as uncoupled, I do not consider it important to rely upon such action, as the operation is performed by hand with such ease and simplicity and so quickly that little or nothing is gained by substituting automatic action therefor.

It should be noted that the heel $10^a$ of the cam-point 10 is so formed that when the lever 9 is brought into the position shown in Fig. 5 this heel withdraws from the recess 15 in the latch bar or plate and stands directly over or outside the edge thereof just in rear of the said recess, thereby holding it firmly against the pipe and preserving the engagement of the jaw with the cam rib or flange on the opposite section.

What I claim is—

1. In a coupling for railway steam-heating and similar pipes, the combination, with the coupling end or coupling-section of the train-pipe, of a sleeve having a limited rotary movement thereon and provided with a cam-rib upon its forward end, the rear face of said rib forming a small angle with the meeting edge of the pipe, a latch pivoted upon a support on said sleeve opposite the thickened part of the cam-rib and provided with a jaw extending in front of the end of the pipe, and a pivoted lift by which said latch may be raised and lowered, substantially as described.

2. In a coupling for railway steam-heating and similar pipes, the combination, with the coupling ends or coupling-sections of the train-pipes, having a limited longitudinal movement, of sleeves mounted on the ends of said coupling ends or sections and provided with cam-ribs having diverging faces, the outer face being substantially parallel with the meeting edges of the coupling-sections, latches pivoted upon supports located upon said sleeves opposite the thicker portion of the cam-ribs thereon, said latches having jaws upon their forward ends which project beyond the ends of the coupling-sections, and lifts pivoted upon the same supports and provided with cam-points adapted to raise said latches, the ends of said levers being connected to the platforms by chains which are drawn taut by the outward longitudinal movement of the coupling-sections, substantially as described.

3. In a coupling for railway steam-heating and similar pipes, the combination, with the coupling-sections of the train-pipes, having a limited longitudinal movement, of sleeves having a partial rotation on the ends of said coupling-sections and provided with wedge-shaped cam-ribs, the front faces of said ribs being substantially coincident with the forward edges of the sleeves, latches pivoted between brackets on said sleeves opposite the thicker portions of the cam-ribs on the same, and levers having their fulcrum-supports on said brackets and provided with cam-points lying between the same and outside the latches and adapted to engage fingers on the backs of the latches and lift the latter, each sleeve being limited in its rotation by a pin or lug on the coupling-section standing in a space formed by removing part of the rear edge of the sleeve between the brackets thereon and the tapered end of the cam-ribs, substantially as described.

4. In a coupling for railway steam-heating and similar pipes, the combination, with the train-pipes, of coupling-sections having a limited longitudinal movement, latches pivotally mounted upon supports having a limited rotary adjustment on the ends of the coupling-sections, the forward ends of said latches extending beyond the ends of the coupling-sections to engage cam-ribs on the other part, and levers pivoted on said supports and having their ends connected by chains to the platforms of the car, said levers being adapted to raise or throw the latches away from the cam-ribs, substantially as described.

5. In a coupling for railway steam-heating and similar pipes, the combination, with the coupling end or coupling-section of the train-pipe, of a sleeve having a limited rotary movement thereon, a latch pivoted on a support on said sleeve, and a pivoted lift by which said latch may be swung away from and toward the pipe, said lift being provided with a cam-point lying in a recess in the latch and having a heel which in the inward position of the latch stands directly over the edge of the latch in rear of the recess to lock it in place, substantially as described.

In testimony whereof I have hereunto set my hand in the presence of two subscribing witnesses.

ROBERT I. HAMPTON.

Witnesses:
  J. F. RHODES,
  C. G. TALMADGE.